United States Patent
Lu et al.

(10) Patent No.: US 11,021,100 B1
(45) Date of Patent: Jun. 1, 2021

(54) LIGHTING VEHICLE FOOT MAT

(71) Applicants: DEXIN ELECTRONIC LTD., Guangdong (CN); DEXIN CORPORATION, New Taipei (TW)

(72) Inventors: Ho-Lung Lu, New Taipei (TW); Shu-Sheng Chen, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/013,660

(22) Filed: Sep. 7, 2020

(30) Foreign Application Priority Data

Jan. 15, 2020 (TW) ................................. 109101295

(51) Int. Cl.
| | |
|---|---|
| *B60Q 3/20* | (2017.01) |
| *B60Q 3/80* | (2017.01) |
| *B60N 3/04* | (2006.01) |
| *H05B 45/10* | (2020.01) |
| *H05B 45/20* | (2020.01) |
| *H05B 47/19* | (2020.01) |
| *H05B 47/17* | (2020.01) |
| *H05B 47/105* | (2020.01) |

(52) U.S. Cl.
CPC ............. *B60Q 3/80* (2017.02); *B60N 3/044* (2013.01); *B60Q 3/20* (2017.02); *H05B 45/10* (2020.01); *H05B 45/20* (2020.01); *H05B 47/105* (2020.01); *H05B 47/17* (2020.01); *H05B 47/19* (2020.01); *B60Q 2900/30* (2013.01)

(58) Field of Classification Search
None
See application file for complete search history.

(56) References Cited

U.S. PATENT DOCUMENTS

| 10,538,198 B1 * | 1/2020 | Cheng ..................... H05B 47/19 |
| 2019/0327814 A1 * | 10/2019 | Altinger .................. H05B 47/18 |

* cited by examiner

*Primary Examiner* — Dedei K Hammond
(74) *Attorney, Agent, or Firm* — Li & Cai Intellectual Property Office

(57) ABSTRACT

A lighting vehicle foot mat includes a foot mat body including a lighting device and a control unit. The control unit includes a memory storing a lighting state list of the lighting device. The lighting state list stores a plurality of lighting states and a plurality of codes corresponding to the plurality of lighting states, a control device controlling a lighting state of the lighting device according to the plurality of codes and a controller area network (CAN) bus transceiver receiving a vehicle control signal and transmitting the vehicle control signal to the control device. The control device analyzes the vehicle control signal to obtain a first code, compares the first code with the plurality of codes in the lighting state list and controls the lighting device according to the first code to generate a lighting state corresponding to the code.

10 Claims, 7 Drawing Sheets

LIGHTING VEHICLE FOOT MAT

CROSS-REFERENCE TO RELATED PATENT APPLICATION

This application claims the benefit of priority to Taiwan Patent Application No. 109101295, filed on Jan. 15, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a foot mat, and more particularly to a lighting vehicle foot mat.

BACKGROUND OF THE DISCLOSURE

Foot mats are often applied when a change of the environment occurs, such as going indoors from outside or getting into cars from outside. The main purpose of foot mats is to prevent the environment indoors or inside vehicles from getting dirty and keep the environment indoor or inside vehicles clean. Especially when being applied inside vehicles, foot mats help prevent interior furnishing of the vehicles from getting dirty when coming in contact with the sole of a shoe.

Moreover, the publication of Taiwan Patent M427302 discloses a vehicle foot mat, and an LED is configured on the foot mat, so that the vehicle can not only be kept clean, but can be illuminated as well. However, despite the advancement to vehicle foot mats, application thereof is still limited to providing illumination.

In order to further advance the application of the foot mat, much research has been devoted to the development of lighting foot mats to improve and increase the application of foot mats.

SUMMARY OF THE DISCLOSURE

In response to the above-referenced technical inadequacies, the present disclosure provides a lighting vehicle foot mat.

In one aspect, the present disclosure provides a lighting vehicle foot mat, which includes a foot mat body, a lighting device, and a control unit. The lighting device is disposed on the edge of the foot mat body and the control unit is configured in the foot mat body. The control unit includes a memory, a control device, and a controller area network (CAN) bus transceiver. The memory stores a lighting state list of the lighting device, and the lighting state stores a plurality of lighting states and a plurality of codes corresponding to the plurality of lighting states. The control device, which is connected to the lighting device and the memory, controls the lighting state of the lighting device according to the plurality of codes. The CAN bus transceiver, which is connected to the control device, receives a vehicle control signal and transmits the vehicle control signal to the control device. The control device analyzes the vehicle control signal to obtain a first code, and the control device compares the first code with the plurality of codes in the lighting state list, and the control device controls the lighting device according to the first code to generate a corresponding lighting state.

Therefore, a lighting vehicle foot mat of the present disclosure is able to provide illumination and generate different lighting states according to different codes and provide users with various vehicle internal environment and atmospheric lighting, which increases the range of application of the foot mat.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
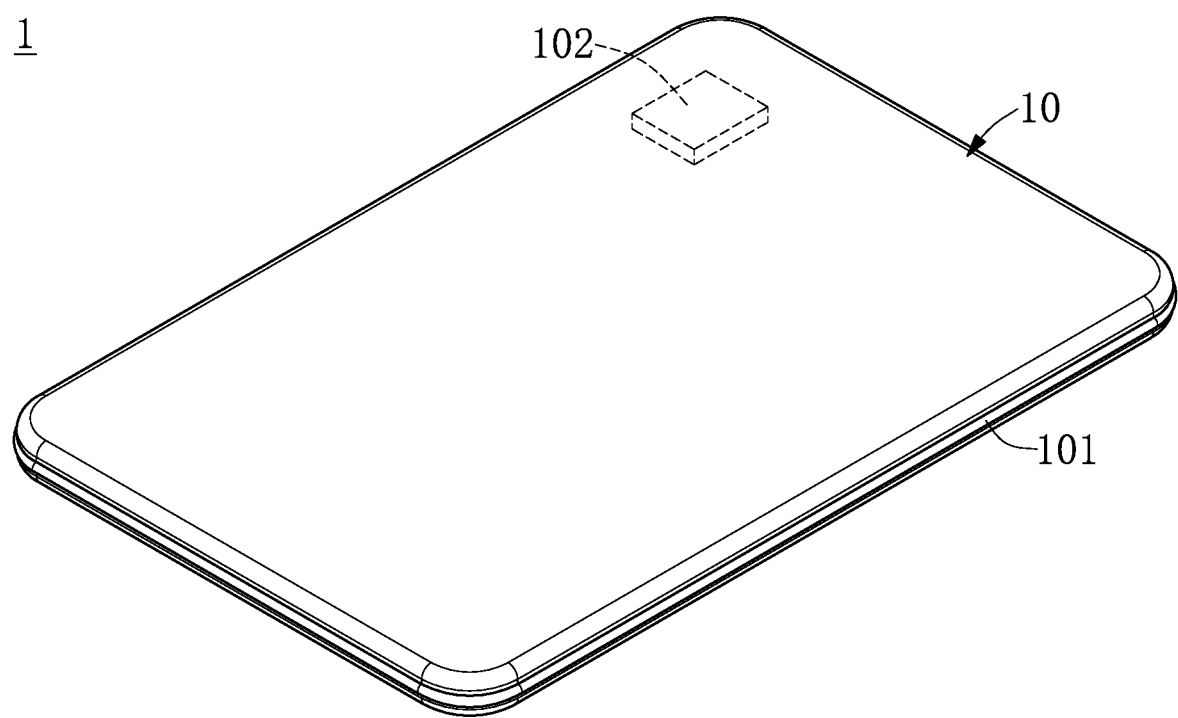
FIG. 1 is a schematic view of a lighting vehicle foot mat in one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1, a schematic view of a lighting vehicle foot mat 1 of one embodiment of the present disclosure is provided. The lighting vehicle foot mat 1 includes a foot mat body 10. As shown in FIG. 1, the foot mat body 10 is exemplified as being rectangular in this embodiment. The foot mat body 10 can also be rectangular, round, or other shapes, and the shape of the foot mat body 10 is not limited in the present disclosure. The foot mat body 10 includes a lighting device 101 and a control unit 102.

The lighting device 101 is disposed on the edge of the foot mat body 10. The lighting device 101 can be an LED light bar or other flexible light bars, but the types of the lighting device 101 are not limited thereto. The lighting device 101 can be disposed on the edge of the foot mat body 10 by adhesion or embedding, but the manners by which the lighting device 101 can be configured on the edge of the foot mat body 10 are not limited thereto.

The control unit 102 is disposed in the foot mat body 10 or on the outside of the foot mat body 10 and connected to the lighting device 101 through an electrical interface. As shown in FIG. 1, the position of the control unit 102 disposed on the edge of the foot mat body 10 is merely an example, and the present disclosure is not limited thereto. As shown in FIG. 1, the control unit 102 is exemplified as being rectangular in this embodiment. The control unit 102 can be rectangular, round, or other shapes, and the present disclosure is not limited thereto. The control unit 102 can be detached from the foot mat body 10, which is convenient for users to clean the foot mat body 10.

Figure 2:
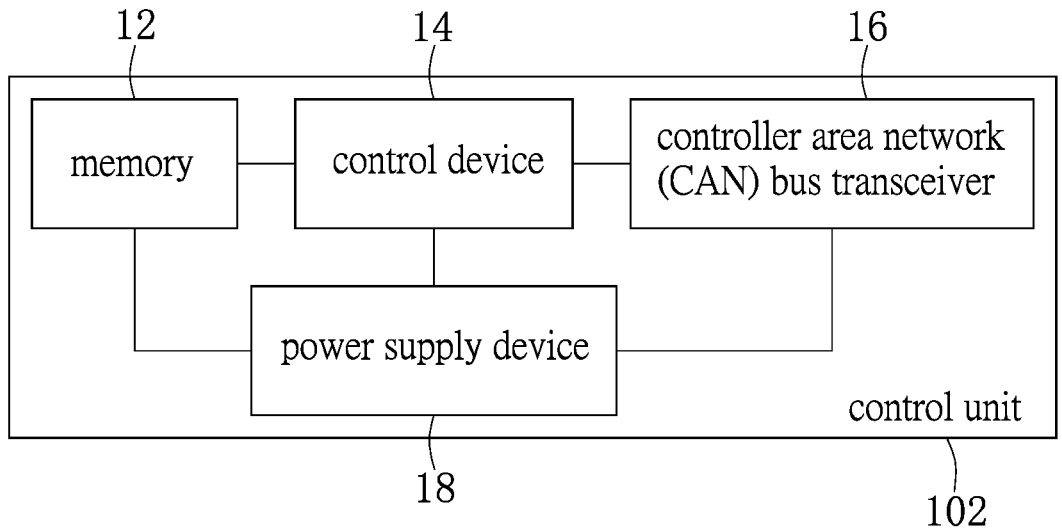
FIG. 2 is a system block diagram of a control unit in one embodiment of the present disclosure.
Figure 4:
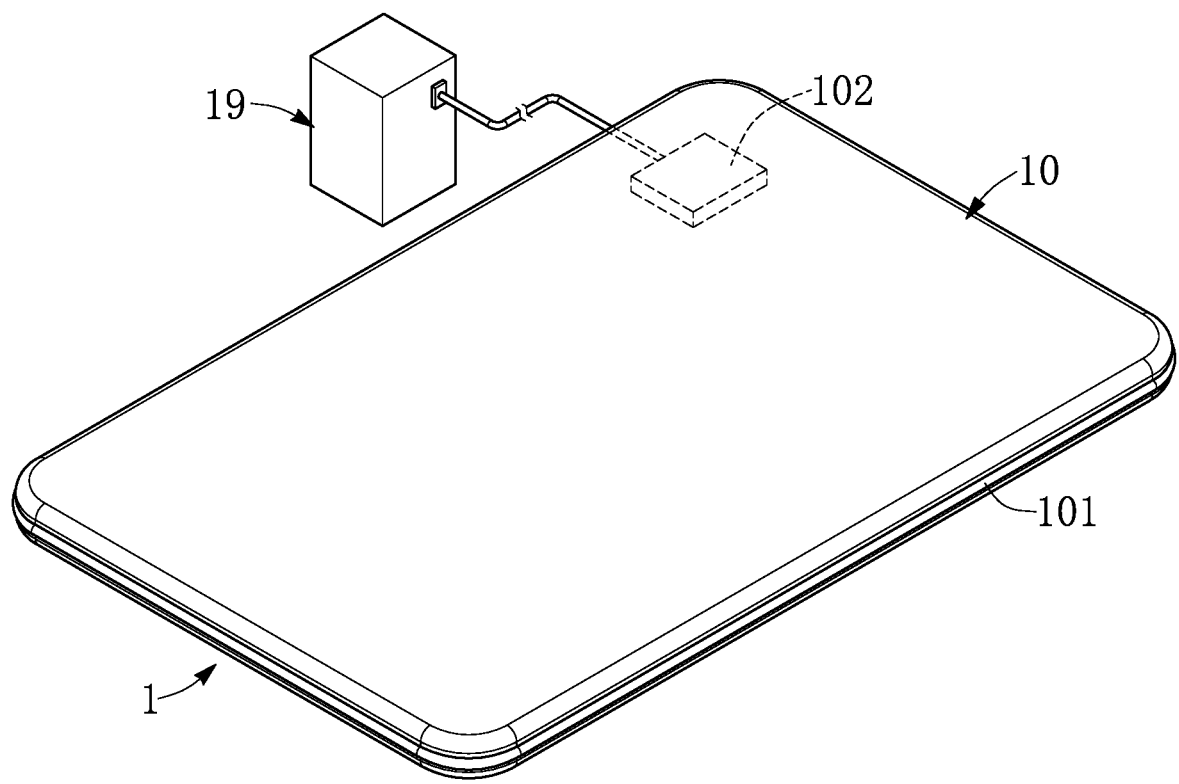
FIG. 4 is a schematic view of a lighting vehicle foot mat in another embodiment of the present disclosure.

Referring to FIG. 2, a system block diagram of a control unit 102 of one embodiment of the present disclosure is provided. Referring to FIG. 4, a schematic view of the lighting vehicle foot mat 1 of another embodiment of the present disclosure is provided. The control unit 102 includes a memory 12, a control device 14, a CAN bus transceiver 16, and a power supply device 18.

The memory 12 stores a lighting state list of the lighting device 101, and the lighting state list stores a plurality of lighting states and a plurality of codes corresponding to the plurality of lighting states.

The control device 14 is connected to the lighting device 101 and the memory 12, and the control device 14 controls the lighting state of the lighting device 101 according to the plurality of codes.

The CAN bus transceiver 16 is connected to the control device 14, and the CAN bus transceiver 16 receives a vehicle control signal and transmits the vehicle control signal to the control device 14. The CAN bus transceiver 16 receives the vehicle control signal from a carputer 19 and transmits the vehicle control signal to the control device 14 to control the lighting state of the lighting device 101 through a CAN bus communication protocol, and receives a lighting state adjusting signal from a carputer 19 through a CAN bus communication protocol and transmits the lighting state adjusting signal to the control device 14 to adjust a flickering frequency, a color brightness, or a color changing frequency of the lighting state of the lighting device 101. The adjustment of the flickering frequency, the color brightness, or the color changing frequency of the lighting state of the lighting device 101 is merely an example, and the present disclosure is not limited thereto.

The power supply device 18 is connected to the lighting device 101, the memory 12, the control device 14 and the CAN bus transceiver 16.

Figure 3:
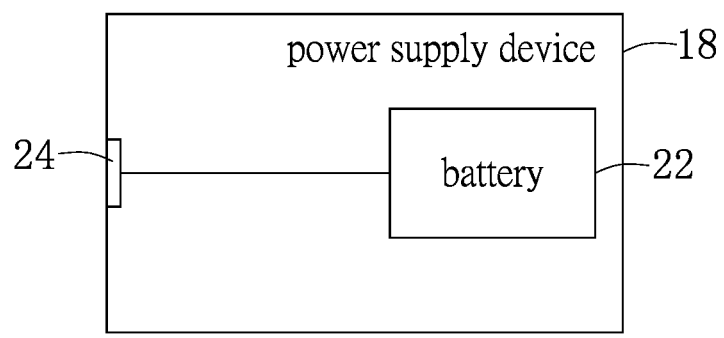
FIG. 3 is a system block diagram of a power supply device in one embodiment of the present disclosure.

Referring to FIG. 3, a system block diagram of the power supply device 18 of one embodiment of the present disclosure is provided. The power supply device 18 includes a battery 22 and an input/output port 24. The input/output port 24 is connected to a vehicle power source, and the input/output port 24 receives electrical power from the vehicle power source and stores the electrical power in the battery 22.

Referring to FIG. 4, in one embodiment of the present disclosure, the CAN bus transceiver 16 of the lighting vehicle foot mat 1 receives the vehicle control signal from the carputer 19, and transmits the vehicle control signal to the control device 14. The control device 14 analyzes the vehicle control signal to obtain a first code, and the control device 14 compares the first code of the vehicle control signal from the carputer 19 with the plurality of codes of the lighting state list. When the control device 14 matches a code of the lighting state list to the first code from the vehicle control signal, the control device 14 controls the lighting device 101 to generate a corresponding lighting state (e.g., three-color flickering), according to the first code of the vehicle control signal.

In one embodiment of the present disclosure, when users sit in a vehicle, users are able to set the lighting state of the lighting device 101 of the lighting vehicle foot mat 1 and the corresponding code, adjust the lighting state of the lighting device 101, match the codes to the lighting states correspondingly, and adjust the order of the lighting states through a human machine interface (HMI). For example, users can add or reduce the lighting states and the corresponding codes, adjust the flickering frequency, the color brightness, and the color changing frequency of the lighting state, change the matching relation between the lighting states and the codes, and adjust the order of the lighting states.

Second Embodiment

Figure 5:
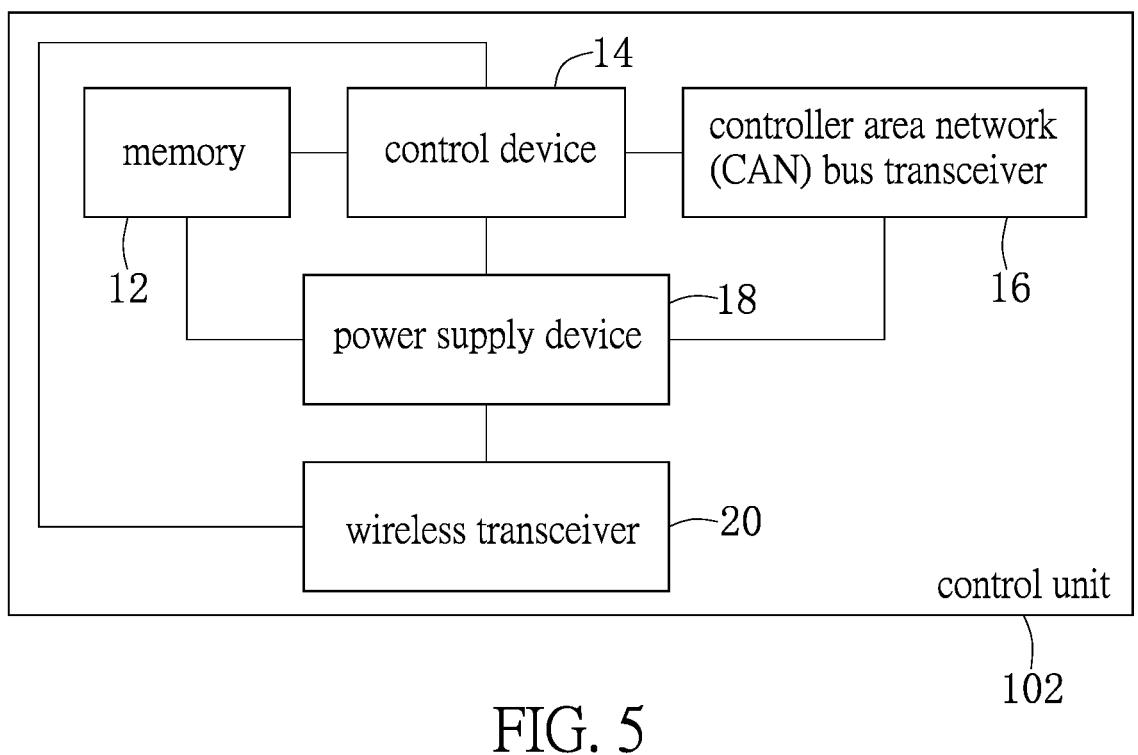
FIG. 5 is a schematic view of a control unit in another embodiment of the present disclosure.

Referring to FIG. 5, a schematic view of another embodiment of the present disclosure is provided. The control unit 102 further includes a wireless transceiver 20, and the wireless transceiver 20 is connected to the control device 14, and the wireless transceiver 20 receives a wireless control signal and transmits the signal to the control device 14. The wireless transceiver 20, through a wireless communication technology, receives a wireless control signal from a carputer 19 and transmits the wireless control signal to the control device 14 to control the lighting state of the lighting device 101. The wireless transceiver 20, through the wireless communication technology, receives a lighting state adjusting signal from the carputer 19 and transmits the lighting state adjusting signal to the control device 14 to adjust the flickering frequency, the color brightness, and the color changing frequency. The wireless communication technology can be Bluetooth® or wireless LAN, but the present disclosure is not limited thereto.

In one embodiment, when the lighting vehicle foot mat 1 is not connected to the carputer 19 through the CAN bus transceiver 16, the lighting vehicle foot mat 1 can be connected to the carputer 19 through the wireless communication technology, and receives the wireless control signal from the carputer 19 and transmits the wireless control signal to the control device 14 to control the lighting state of the lighting state 101, through the wireless communication technology. The lighting vehicle foot mat 1 can, through the wireless communication technology, receive a lighting state adjusting signal from the carputer 19 and transmit the lighting state adjusting signal to the control device 14 to adjust the flickering frequency, the color brightness, and the color changing frequency of the lighting state of the lighting device 101.

In one embodiment, the wireless transceiver 20 of the lighting vehicle foot mat 1 receives a wireless control signal from the carputer 19 and transmits the wireless control signal to the control device 14. The control device 14 analyzes the vehicle control signal to obtain a second code, and the control device 14 compares the second code of the vehicle control signal from the carputer 19 with the plurality of codes of the lighting state list. When the control device 14 matches a code of the lighting state list to the second code from the vehicle control signal, the control device 14 controls the lighting device 101 to generate a corresponding lighting state (e.g., three-color flickering), according to the second code of the vehicle control signal.

Third Embodiment

Figure 6:
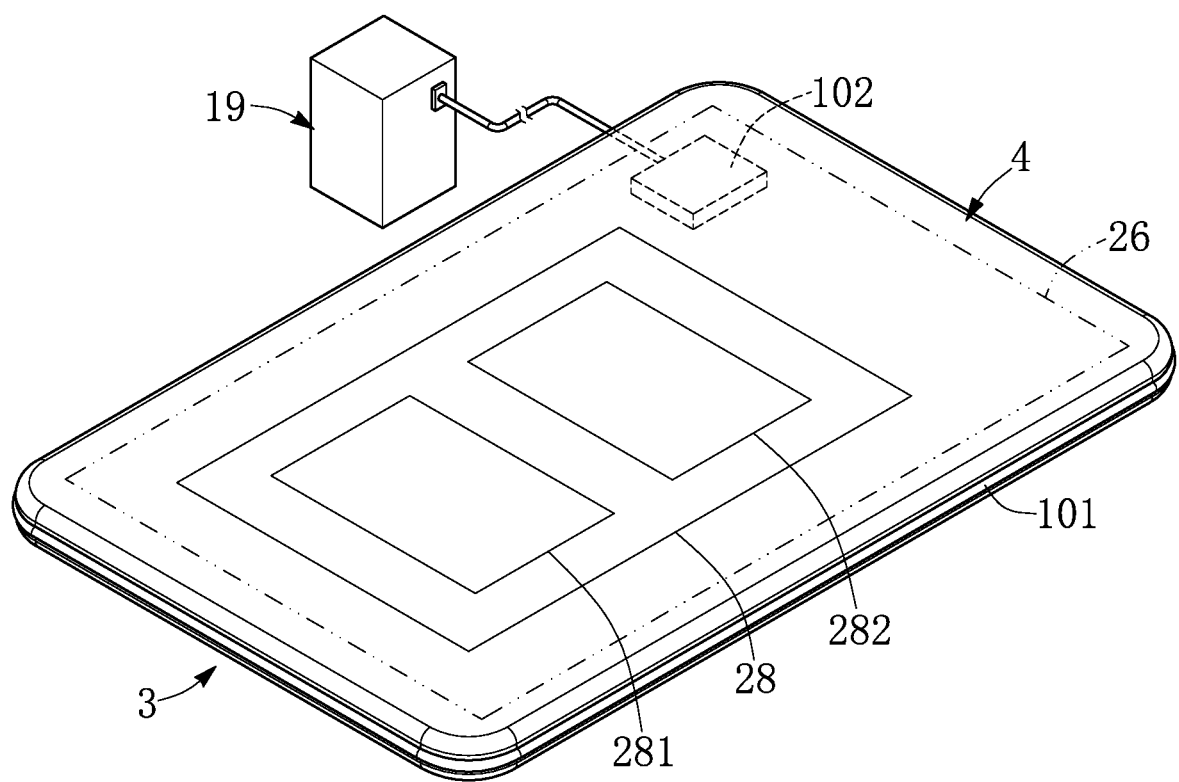
FIG. 6 is a system block diagram of a lighting vehicle foot in another embodiment of the present disclosure.

Reference is made to FIG. 6, and in conjunction with FIG. 1 and FIG. 2. FIG. 6 is a schematic view of the lighting vehicle foot mat 3 of another embodiment of the present disclosure. The lighting vehicle foot mat 3 includes a foot mat body 4. A control circuit 26 of the lighting vehicle foot mat 3 further includes a keyboard interface 28, and a first button 281 and a second button 282 disposed on the keyboard interface 28. The keyboard interface 28 is electrically connected to the control device 14, and the control device 14 receives a keyboard signal when the keyboard interface 28 is pressed. The control device 14 controls the lighting device 101 according to the keyboard signal. The control device 14 wirelessly executes the operation of the CAN bus transceiver 16 through the wireless transceiver 20, according to the keyboard signal. When the control device 14 receives a caller ID from the carputer 19, the control device 14 activates the first button 281 and the second button 282 on the keyboard interface 28 to proceed with an incoming call operation. When the control device 14 does not receive the caller ID from the carputer 19, the control device 14 can switch to controlling the color, the flickering frequency, the color brightness, and the color changing frequency of the lighting device 101 via pressing of the first button 281 and the second button 282 on the keyboard interface.

For example, when a phone call occurs, users can pick up the phone by pressing the first button 281 once, such that the color of the light emitted by the lighting device 101 becomes green and the lighting state becomes constantly lit. Users can be made clearly aware that the phone has been picked up, and can start the call. Users can end the call and hang up by pressing the second button 282 once, such that the color of the light emitted by the lighting device 101 becomes red, and the lighting state becomes constantly lit. Users can be made clearly aware that the call is hung up and ended. After a certain period of time, the lighting state turns from constantly lit to constantly dark.

When an incoming call occurs during a call, the color of the light emitted by the lighting device 101 is still green, but the lighting state changes into flickering. Users can be made clearly aware that an incoming call is occurring. Users can then press the first button 281 twice and pick up the phone. The color of the light emitted by the lighting device 101 is yellow and the lighting state becomes flickering, indicating that the first call is on hold.

Users can return to the first call by pressing the first button 281 once again. The color of the light emitted by the lighting device 101 turns back into green and the lighting state becomes flickering, indicating that the incoming call has not been hung up. User can pick up the incoming call again by pressing the first button 281 twice again. When the incoming call is picked up, the color of the light emitted by the lighting device 101 becomes yellow and the lighting state becomes flickering again. Users can then end the incoming call and hang up by pressing the second button 282 twice. The color of the light emitted by the lighting device 101 becomes red again and the lighting state becomes flickering.

When the first call is not hung up, the control device 14 automatically picks up the first call. The color of the light emitted by the lighting device 101 becomes green and the lighting state becomes constantly lit again. When the first call is hung up, the color of the light emitted by the lighting device 101 becomes red again and the lighting state becomes constantly lit. After a certain period of time, the lighting state turns from constantly lit to constantly dark. The above mentioned call control method and the corresponding colors of the light emitted by the lighting device 101 is merely one embodiment of the present disclosure, and the present disclosure is not limited thereto.

The above mentioned method of answering a call can be illustrated in the following table:

| Number | Action | Button-pressing sequence | Color of the light emitted by the lighting device | Lighting state |
|---|---|---|---|---|
| First call | pick up | Press the first button once | green | constantly lit |
| | hang up | Press the second button once | red | constantly lit |
| Second call (the incoming call) | pick up | Press the first button twice | yellow | flickering |
| | hang up | Press the second button twice | red | flickering |

In one embodiment of the present disclosure, the flickering frequency of the lighting device 101 varies when the call is from a contact in a commonly used contact group.

For example, when the caller is a parent or the wife of a user, the control device 14 is set to be at level 1, and the flickering frequency of the lighting device 101 flickers once every 5 seconds. When the caller is a supervisor or a colleague of a user, the control device 14 is set to be at level 2, and the flickering frequency of the lighting device 101 flickers once every 10 seconds. When the caller is a friend of a user, the control device 14 is set to be at level 3, and the flickering frequency of the lighting device 101 flickers once every 15 seconds. When the caller has an unknown number, the control device 14 is set to be at level 4, and the flickering frequency of the lighting device 101 flickers once every 20 seconds.

Users can turn off the flickering function of the lighting device 101 by pressing the first button 281 and the second button 282 simultaneously for over 5 seconds, and after the control device 14 receives the keyboard signal, the lighting device 101 can be turned off immediately. Users can restart the flickering function of the lighting device 101 by the same method by pressing the first button 281 and the second button 282 simultaneously for over 5 seconds, and the flickering function of the lighting device 101 can be restored. The above mentioned flickering frequency of the lighting device is merely one embodiment of the present disclosure, and the present disclosure is not limited thereto.

Figure 7:
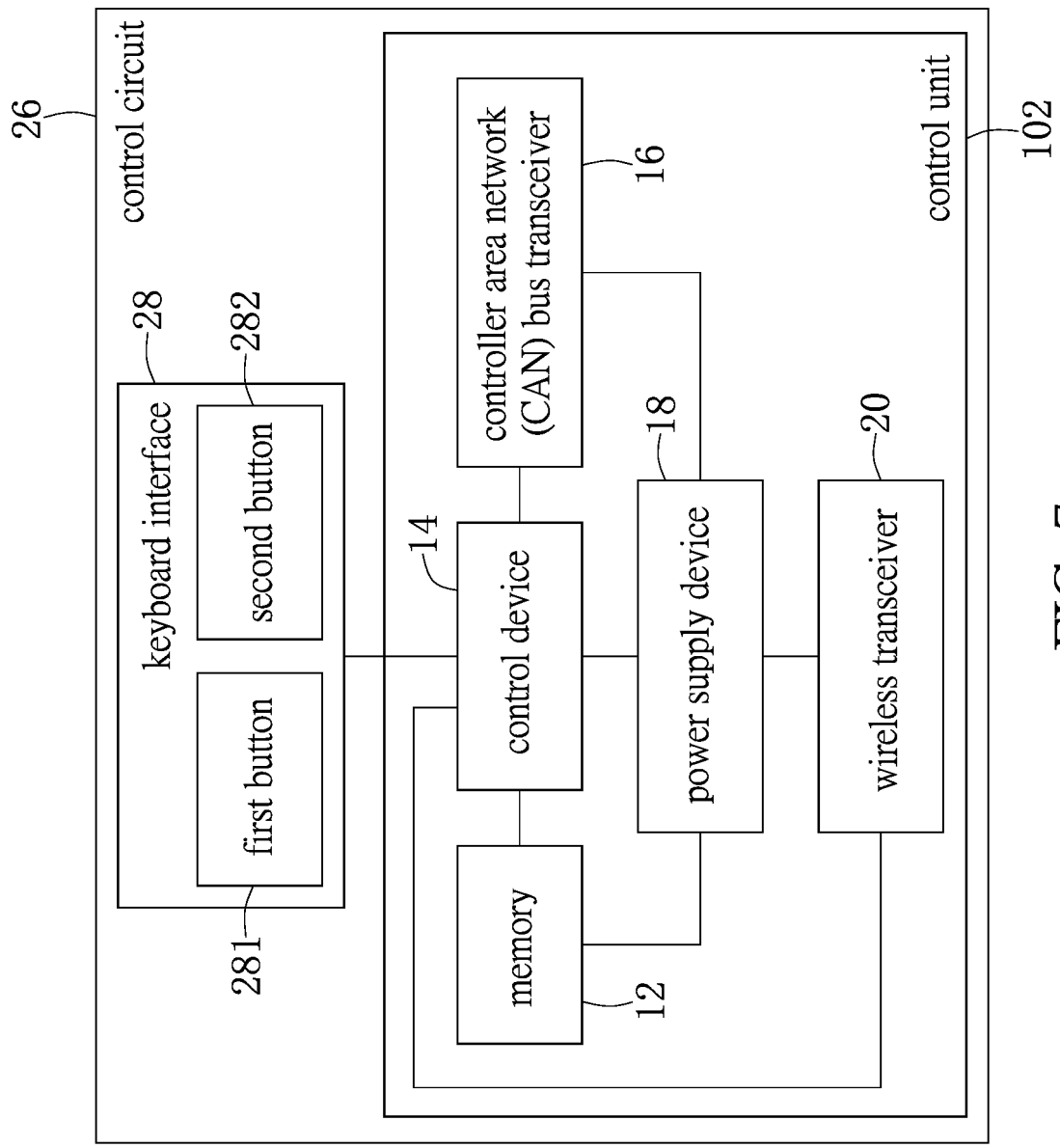
FIG. 7 is a system block diagram of a control unit in another embodiment of the present disclosure.

Referring to FIG. 7, and in conjunction with FIG. 6, a system block diagram of the control circuit 26 of another embodiment of the present disclosure is provided. The control circuit 26 further includes a keyboard interface 28, and a first button 281 and a second button 282 are disposed on the keyboard interface 28. The keyboard interface 28 is electrically connected to the control device 14 in the control unit 102, and the control device 14 receives a keyboard signal generated when the keyboard interface is pressed. The number of buttons on the keyboard interface 28 is not limited in the present disclosure. The lighting device 101 can correspondingly adjust the color, the flickering frequency, the color brightness, or the color changing frequency of the lighting state according to the button on the keyboard interface 28 being pressed. The number of times that the keyboard interface 28 is pressed is not limited in the present disclosure. When the control device 14 does not receive the caller ID from the carputer 19, the control device 14 can switch to controlling the color, the flickering frequency, the color brightness, or the color changing frequency of the lighting device 101 via the first button 281 and the second button 283 on the keyboard interface 28 being pressed.

For example, when a button on the keyboard interface 28 is pressed, only the color of the light emitted by the lighting device 101 changes, and the flickering frequency, the color brightness, and the color changing frequency provided for the users to choose from remain in factory settings. For example, a first button 281 is on the keyboard interface 28. When the first button 281 is pressed, the color of the light emitted by the lighting device 101 becomes red. When the control device 14 in a control circuit 26 receives the keyboard signal when the keyboard interface 28 is pressed, the control device 14 correspondingly controls the lighting device 101 to change the color of the light emitted by the lighting device 101 to orange. The present disclosure does not limit the adjustment of the color of the light emitted by the lighting device 101.

For example, when a button on the keyboard interface 28 is pressed, only the flickering frequency of the lighting device 101 changes, and the color, the color brightness, and the color changing frequency provided for the users to choose from remain in factory settings. For example, when the first button 281 is pressed, the flickering frequency of the lighting device 101 becomes non-flickering. When the control device 14 in the control circuit 26 receives the keyboard signal generated when the keyboard interface 28 is pressed, the control device 14 correspondingly controls the lighting device 101 to change the flickering frequency of the lighting device 101 to flickering. The present disclosure does not limit the adjustment of the flickering frequency of the lighting device 101.

For example, when a button on the keyboard interface 28 is pressed, only the color brightness of the lighting device 101 changes, and the color, the flickering frequency, and the color changing frequency provided for the users to choose from remain in factory settings. For example, when the first button 281 is pressed, the color brightness of the lighting device 101 is at the brightest. When the control device 14 in the control circuit 26 receives the keyboard signal generated when the keyboard interface 28 is pressed, the control device 14 correspondingly controls the lighting device 101 to change the color brightness of the lighting device 101 to medium. When the control device 14 determines that the first button 281 is continuously pressed, the control device 14 controls the color brightness of the lighting device 101 to be at the brightest. The present disclosure does not limit the number of times that the keyboard interface 28 is pressed and the level of brightness of the color brightness of the lighting device 101.

For example, when a button on the keyboard interface 28 is pressed, only the color changing frequency of the lighting device 101 changes, and the color, the flickering frequency, and the color brightness provided for the users to choose from remain in factory settings. For example, when the first button 281 is pressed, the color changing frequency of the lighting device 101 becomes red and white alternating every 10 seconds. When the control device 14 in the control circuit 26 receives the keyboard signal generated when the keyboard interface 28 is pressed, the control device 14 correspondingly controls the lighting device 101 to change the color changing frequency of the lighting device 101 to red and white alternating every 5 seconds. The present disclosure does not limit the adjustment of the color and the color changing frequency of the lighting device 101.

The lighting state of the lighting device 101 can be adjusted simultaneously or separately according to the habits of users. For example, the color and the flickering frequency can be adjusted without adjusting the color brightness and the color changing frequency. For example, the flickering frequency and the color brightness can be adjusted without adjusting the color and the color changing frequency. The above mentioned plurality of lighting states is merely one embodiment of the present disclosure, and the present disclosure is not limited thereto.

Fourth Embodiment

Figure 8:
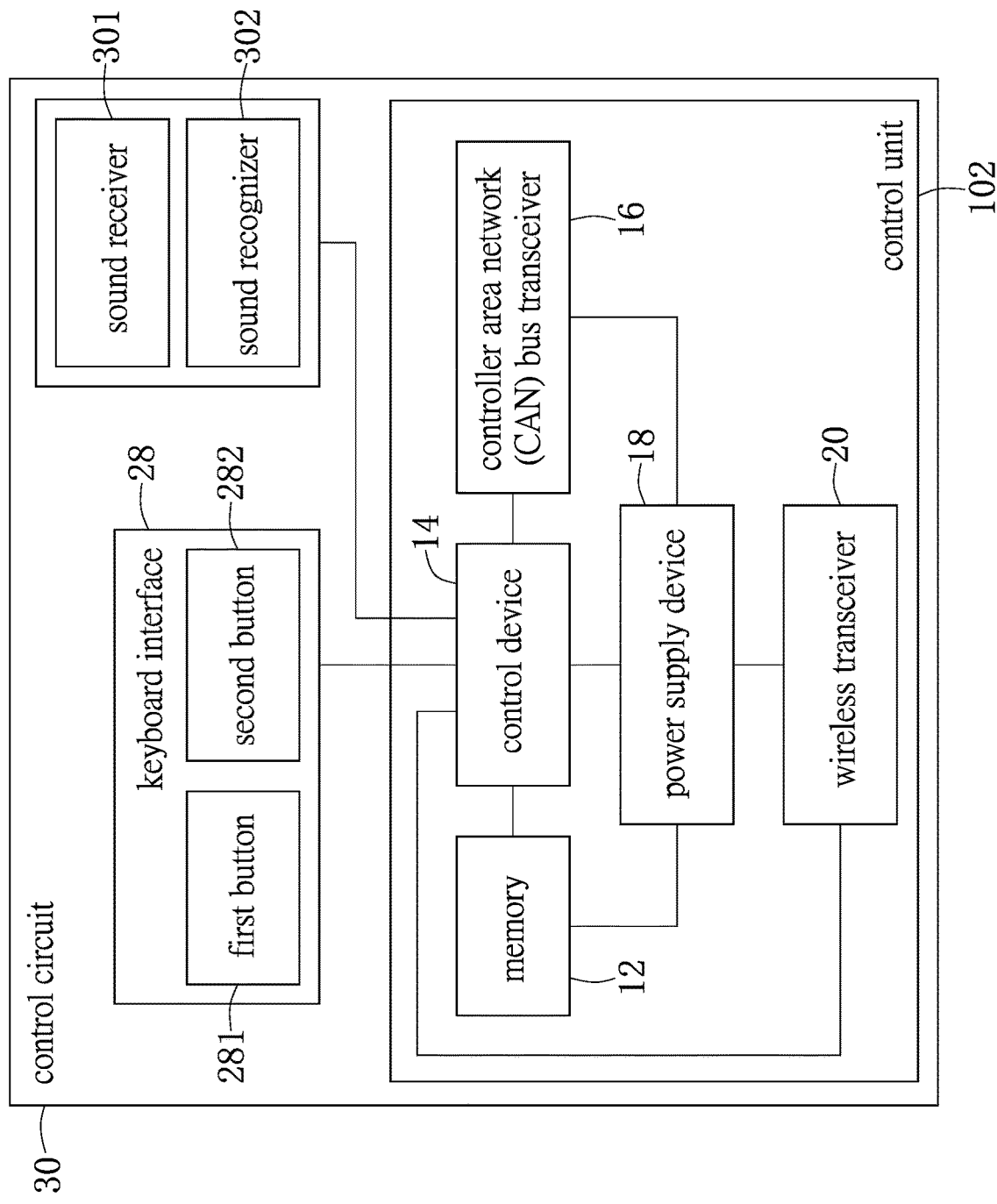
FIG. 8 is a system block diagram of a control unit in another embodiment of the present disclosure.

Referring to FIG. 8, a system block diagram of a control circuit 30 of another embodiment of the present disclosure is provided. The control circuit 30 further includes a sound receiver 301 and a sound recognizer 302. The sound receiver 301 and the sound recognizer 302 are electrically connected to the control device 14 in the control unit 102. The sound recognizer 302 recognizes a sound signal received by the sound receiver 301. The control device 14 controls the flickering frequency, the color brightness, or the color changing frequency of the lighting state of the lighting device 101.

For example, users may encounter situations where they are unable to control the lighting state of the lighting device 101, since they may have to focus on driving. Users may encounter situations that are inconvenient to press the keyboard interface 28 to control the lighting state of the lighting device 101 by foot, as when encountering poor terrain and having to step on the accelerator and the brake for multiple times. In the above mentioned situations, users can use sound to control the lighting state of the lighting device 101. The sound receiver 301 of the control circuit 30 receives a sound from a user and transmits the sound from the user to the control device 14. The control device 14 recognizes the sound signal received by the sound receiver 301 by the sound recognizer 302. The control device 14 controls the lighting device 101, according to the sound signal corresponding to the plurality of codes of the plurality of the lighting states that the control device 14 receives.

For example, when the sound recognizer 302 recognizes a first sound signal, the control device 14 searches the lighting list of the lighting device 101 according to the first sound signal, and matches the first sound signal to a first code corresponding a first lighting state. The control device 14 controls the color of the light emitted by the lighting device 101 to red.

For example, when the sound recognizer 302 recognizes a second sound signal, the control device 14 searches the lighting state list of the lighting device 101 according to the second sound signal, and matches the second sound signal to a second code corresponding a second lighting state. The control device 14 controls the flickering frequency of the lighting device 101 to flicker once per 5 seconds.

For example, when the sound recognizer 302 recognizes a third sound signal, the control device 14 searches the lighting state list of the lighting device 101 according to the third sound signal, and matches the third sound signal to a third code corresponding to a third lighting state. The control device 14 controls the color changing frequency of the lighting device 101 to red and white alternating every 5 seconds.

For example, when the sound recognizer 302 recognizes a fourth sound signal, the control device 14 searches the lighting state list of the lighting device 101 according to the fourth sound signal, and matches the fourth sound signal to a fourth code corresponding to a fourth lighting state. The control device 14 controls the color brightness of the lighting device 101 to medium.

The above mentioned method of controlling the lighting device 101 to change the corresponding lighting state by recognizing the sound is merely one embodiment of the present disclosure, and the present disclosure is not limited thereto. Positions of the lighting vehicle foot mat 1 or the lighting vehicle foot mat 2 provided by the present disclosure are also not limited, and the lighting vehicle foot mat 1 or the lighting vehicle foot mat 2 can be disposed at any location where sound can be conveniently received. When the lighting vehicle foot mat 1 or the lighting vehicle foot mat 2 are used at a driver's seat, the lighting vehicle foot mat 1 or the lighting vehicle foot mat 2 can preferably be disposed on the left of the driver's seat, which makes it convenient for drivers to control, but the present disclosure is not limited thereto.

In conclusion, the lighting vehicle foot mat provided by the present disclosure is able to provide illumination and generate different lighting states according to different codes and can be connected to the carputer wirelessly or via a wire to provide users the freedom to set various vehicle internal environment and atmospheric lighting, which increase the range of applications of foot mats. In addition, the lighting vehicle foot mat can control the lighting device to have different flickering frequency, color brightness, or color changing frequency of the lighting state, according to the keyboard signal received by the control device or the recognized result of the sound. When using hands to control is not convenient, the lighting vehicle foot mat provides convenient control via the keyboard interface or by recognizing a sound.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

Alternative embodiments will become apparent to those skilled in the art to which the present disclosure pertains without departing from its spirit and scope.

What is claimed is:

1. A lighting vehicle foot mat, comprising:
    a foot mat body, the foot mat body including:
        a lighting device disposed on the edge of the foot mat body; and
        a control unit configured in the foot mat body, the control unit including:
            a memory storing a lighting state list of the lighting device, wherein the lighting state list stores a plurality of lighting states and a plurality of codes corresponding to the plurality of lighting states;
            a control device connected to the lighting device and the memory, the control device controlling the lighting state of the lighting device according to the plurality of codes; and
            a controller area network (CAN) bus transceiver connected to the control device, the CAN bus transceiver receiving a vehicle control signal and transmitting the wireless control signal to the control device;
        wherein the control device analyzes the vehicle control signal to obtain a first code, and the control device controls the lighting device according to the first code to generate a corresponding lighting state.

2. The lighting vehicle foot mat according to claim 1, wherein the control unit further includes:
    a power supply device, including:
        a battery; and
        an input/output port connected to the battery and a vehicle power source, the input/output port receiving electrical power from the vehicle power source and storing the electrical power in the battery;
    wherein the power supply device is connected to the lighting device, the memory, the control device and the CAN bus transceiver, and the power supply device supplies electricity to the lighting device, the memory, the control device and the CAN bus transceiver.

3. The lighting vehicle foot mat according to claim 1, wherein the CAN bus transceiver receives the vehicle control signal from a carputer through a CAN bus communication protocol, and the CAN bus transceiver receives a lighting state adjusting signal from the carputer through the CAN bus communication protocol and transmits the lighting state adjusting signal to the control device to adjust a flickering frequency, a color brightness, or a color changing frequency of the lighting state of the lighting device.

4. The lighting vehicle foot mat according to claim 1, wherein the wireless communication technology is Bluetooth® or wireless LAN, the lighting device is an LED light bar, and wherein the plurality of codes respectively correspond to device statuses including a caller ID, a missed call reminder, a text message notification, a device battery percentage, or an application notification of a CAN bus transceiver.

5. The lighting vehicle foot mat according to claim 1, wherein the control unit further includes:
    a wireless transceiver connected to the control device, the wireless transceiver receiving a wireless control signal and transmitting the wireless control signal to the control device;

wherein the control device analyzes the wireless control signal to obtain a second code, the control device comparing the second code to the plurality of codes of the lighting state list, and the control device controlling the lighting device to generate a corresponding lighting state according to the second code.

6. The lighting vehicle foot mat according to claim 5, wherein the wireless transceiver receives a wireless control signal and a lighting state adjusting signal from a carputer through a wireless communication technology to adjust the flickering frequency, the color brightness, or the color changing frequency of the lighting state of the lighting device.

7. The lighting vehicle foot mat according to claim 1, wherein the foot mat body further includes a keyboard interface, the keyboard interface is connected to the control device, and the control device receives a keyboard signal generated when the keyboard interface is pressed.

8. The lighting vehicle foot mat according to claim 7, wherein the control device controls the lighting device according to the keyboard signal.

9. The lighting vehicle foot mat according to claim 7, wherein the control device wirelessly controls, through the wireless transceiver, an operation of the CAN bus transceiver according to the keyboard signal.

10. The lighting vehicle foot mat according to claim 7, further comprising:
- a sound receiver connected to the control device; and
- a sound recognizer connected to the control device, the sound recognizer recognizing a sound signal received by the sound receiver;

wherein the control device controls a flickering frequency, a color brightness, or a color changing frequency of the lighting state of the lighting device according to a result produced by the sound recognizer.

\* \* \* \* \*